(12) United States Patent
Haberecht et al.

(10) Patent No.: US 8,969,452 B2
(45) Date of Patent: Mar. 3, 2015

(54) QUICK-DRYING COATING COMPOUNDS

(75) Inventors: Monika Haberecht, Ludwigshafen (DE); Angelika Maria Steinbrecher, Stuttgart (DE); Christof Kujat, Neustadt (DE); Alexander Traut, Schriesheim (DE)

(73) Assignee: BASF SE, Ludwigshafen (DE)

( * ) Notice: Subject to any disclaimer, the term of this patent is extended or adjusted under 35 U.S.C. 154(b) by 342 days.

(21) Appl. No.: 13/140,257

(22) PCT Filed: Dec. 8, 2009

(86) PCT No.: PCT/EP2009/066614
§ 371 (c)(1),
(2), (4) Date: Jun. 16, 2011

(87) PCT Pub. No.: WO2010/069818
PCT Pub. Date: Jun. 24, 2010

(65) Prior Publication Data
US 2011/0250438 A1  Oct. 13, 2011

(30) Foreign Application Priority Data
Dec. 17, 2008  (EP) .................... 08172008

(51) Int. Cl.
*C08K 5/24* (2006.01)
*B60C 1/00* (2006.01)
*C09D 201/00* (2006.01)
*B82Y 30/00* (2011.01)
*C08G 18/40* (2006.01)
*C08G 18/42* (2006.01)
*C08G 18/62* (2006.01)
*C08G 18/79* (2006.01)
*C09D 175/06* (2006.01)
*C08K 3/36* (2006.01)
*C08K 7/18* (2006.01)
*C08K 9/06* (2006.01)

(52) U.S. Cl.
CPC ............. *C09D 201/005* (2013.01); *B82Y 30/00* (2013.01); *C08G 18/4063* (2013.01); *C08G 18/423* (2013.01); *C08G 18/4241* (2013.01); *C08G 18/6216* (2013.01); *C08G 18/792* (2013.01); *C09D 175/06* (2013.01); *C08K 3/36* (2013.01); *C08K 7/18* (2013.01); *C08K 9/06* (2013.01)
USPC ............. 524/265; 524/261; 524/507; 528/25; 528/28; 528/48; 528/59; 528/60; 528/80; 528/81

(58) Field of Classification Search
USPC ........ 528/48, 59, 60, 80, 81, 25, 28; 524/261, 524/265, 507
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 5,780,530 A | 7/1998 | Mizutani et al. | |
| 6,423,816 B1 | 7/2002 | Wamprecht et al. | |
| 7,858,733 B2 | 12/2010 | Bruchmann et al. | |
| 2004/0161538 A1 | 8/2004 | Boehme et al. | |
| 2007/0213501 A1* | 9/2007 | Bruchmann et al. | ........ 528/302 |
| 2008/0268286 A1 | 10/2008 | Ishihara et al. | |
| 2010/0048813 A1 | 2/2010 | Clauss et al. | |

FOREIGN PATENT DOCUMENTS

| | | | |
|---|---|---|---|
| DE | 100 13 186 | 9/2001 | |
| DE | 100 13 187 | 10/2001 | |
| EP | 0 126 299 | 11/1984 | |
| EP | 0 126 300 | 11/1984 | |
| EP | 0 355 443 | 2/1990 | |
| EP | 1 905 790 | 4/2008 | |
| JP | H08-239458 | 9/1996 | |
| JP | 10-067844 | 3/1998 | |
| JP | 2004-263172 | 9/2004 | |
| JP | 2007-016164 | 1/2007 | |
| WO | 2004 076519 | 9/2004 | |
| WO | 2004 076520 | 9/2004 | |
| WO | 2005 087828 | 9/2005 | |
| WO | 2005 118677 | 12/2005 | |
| WO | 2006 044376 | 4/2006 | |
| WO | WO2006128793 | * 12/2006 | ............... C09C 1/30 |
| WO | 2007 016234 | 2/2007 | |
| WO | 2007 125029 | 11/2007 | |
| WO | 2007 146353 | 12/2007 | |
| WO | 2008 145585 | 12/2008 | |

OTHER PUBLICATIONS

International Search Report issued Feb. 24, 2010 in PCT/EP09/066614 filed Dec. 8, 2009.
U.S. Appl. No. 13/140,147, filed Jun. 16, 2011, Haberecht, et al.
Notification of Reasons for Refusal in corresponding Japanese Patent Application No. 2011-541324. (English translation).

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

The present invention relates to quick-drying two-component polyurethane coating compositions, to processes for preparing them, and to their use.

25 Claims, No Drawings

QUICK-DRYING COATING COMPOUNDS

The present invention relates to quick-drying two-component polyurethane coating compositions, to processes for preparing them, and to their use.

Two-component polyurethane coating compositions are widespread, for example, for coating in the automobile industry. Coating systems of this kind are subject to exacting requirements in respect of qualities including scratch resistance, flexibility, and hardness.

For processing when coating, quick drying is essential, since it allows the coated substrates to be processed further more quickly.

The addition of nanoparticulate silicate particles to coating compositions for the purpose of increasing the scratch resistance is known.

From the international application with the file reference PCT/EP2008/056270 it is known to modify nanoparticulate silicate in such a way that it is easier to incorporate into coating compositions. In that case, functional groups which are incorporated into the coating composition by reaction are applied to the silicate surface.

The resulting coating compositions do not exhibit any particular properties in respect to their drying characteristics.

WO 2007/146353 A2 describes the dispersing of nanoparticulate silica particles into coating compositions with the aid of branched or hyperbranched oligomers.

The branched oligomers used in that case function there as dispersants for the silica particles and do not exert any significant effect on the drying. Moreover, the nanoparticulate silica particles used therein undergo agglomeration in the course of curing, and so the properties of the nanoscale primary particles are lost.

A disadvantage of the process described therein is that preferred binders described therein have to carry silyl groups in order to ensure optimum compatibility between nanoparticles and binder.

It was an object of the present invention to provide two-component polyurethane coating compositions which exhibit improved drying relative to other two-component coating compositions.

This object has been achieved by means of two-component polyurethane coating compositions comprising as synthesis components
(A) at least one polyisocyanate obtainable by reacting at least one monomeric isocyanate,
(B) at least one hydroxyl-containing poly(meth)acrylate polyol,
(C) at least one hyperbranched polyester polyol, either obtainable by polycondensation of
  at least one dicarboxylic acid $A_2$ or derivatives thereof,
  optionally of at least one tri-functional or higher polyfunctional carboxylic acid $A_x$ with $x \geq 3$ or derivatives thereof, and
  at least one tri-functional or higher polyfunctional alcohol $B_y$ with $y \geq 3$, and also
  optionally at least one diol $B_2$,
or obtainable by polycondensation of
  at least one tri-functional or higher polyfunctional carboxylic acid $A_x$ with or derivatives thereof,
  optionally at least one dicarboxylic acid $A_2$ or derivatives thereof, and
  at least one diol $B_2$, and also
  optionally at least one tri-functional or higher polyfunctional alcohol $B_y$ with $y \geq 3$, and (D) silicate particles with a size of 5 to 150 nm whose surface has been modified with an at least monoalkoxylated silyl compound (S).

In comparison to comparable two-component polyurethane coating compositions, the coating compositions of the invention exhibit accelerated drying. The hardness of the resulting coatings is at least retained. Preferably the coating compositions of the invention additionally exhibit improved reflow behavior on heating.

Component (A): At least one polyisocyanate obtainable by reacting at least one monomeric isocyanate As component (A) use is made of at least one, one to four for example, preferably one to three, more preferably one to two, and very preferably precisely one, polyisocyanate which is obtainable by reacting at least one monomeric isocyanate.

The monomeric isocyanates used may be aromatic, aliphatic or cycloaliphatic, preferably aliphatic or cycloaliphatic, which is referred to for short in this text as (cyclo)aliphatic; aliphatic isocyanates are particularly preferred.

Aromatic isocyanates are those which comprise at least one aromatic ring system, in other words not only purely aromatic compounds but also araliphatic compounds.

Cycloaliphatic isocyanates are those which comprise at least one cycloaliphatic ring system.

Aliphatic isocyanates are those which comprise exclusively linear or branched chains, i.e., acyclic compounds.

The monomeric isocyanates are preferably diisocyanates, which carry precisely two isocyanate groups. They can, however, in principle also be monoisocyanates, having one isocyanate group.

In principle, higher isocyanates having on average more than 2 isocyanate groups are also possible. Suitability therefor is possessed for example by triisocyanates, such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenation of corresponding aniline/formaldehyde condensates and represent methylene-bridged polyphenyl polyisocyanates.

These monomeric isocyanates do not contain any substantial products of reaction of the isocyanate groups with themselves.

The monomeric isocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g., methyl 2,6-diisocyanatohexanoate or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)tricyclo-[5.2.1.0$^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanato-methyl)cyclohexane, isophorone diisocyanate, and 4,4'- or 2,4'-di(isocyanato-cyclohexyl)methane, very particular preference to isophorone diisocyanate and hexamethylene 1,6-diisocyanate, and especial preference to hexamethylene 1,6-diisocyanate.

Mixtures of said isocyanates may also be present.

Isophorone diisocyanate is usually in the form of a mixture, specifically a mixture of the cis and trans isomers, generally in a proportion of about 60:40 to 80:20 (w/w), preferably in a proportion of about 70:30 to 75:25, and more preferably in a proportion of approximately 75:25.

Dicyclohexylmethane 4,4'-diisocyanate may likewise be in the form of a mixture of the different cis and trans isomers.

For the present invention it is possible to use not only those diisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI) can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, optionally, of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, monomeric isocyanates having a higher chlorine content can also be used, of up to 500 ppm, for example.

It will be appreciated that it is also possible to employ mixtures of those monomeric isocyanates which have been obtained by reacting the (cyclo)aliphatic diamines with, for example, urea and alcohols and cleaving the resulting (cyclo)aliphatic biscarbamic esters, with those diisocyanates which have been obtained by phosgenating the corresponding amines.

The polyisocyanates (A) to which the monomeric isocyanates can be oligomerized are generally characterized as follows:

The average NCO functionality of such compounds is in general at least 1.8 and can be up to 8, preferably 2 to 5, and more preferably 2.4 to 4.

The isocyanate group content after oligomerization, calculated as NCO=42 g/mol, is generally from 5% to 25% by weight unless otherwise specified.

The polyisocyanates (A) are preferably compounds as follows:

1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoiso-cyanurates and in particular to those based on hexamethylene diisocyanate and isophorone diisocyanate. The isocyanurates present are, in particular, trisisocyanatoalkyl and/or trisisocyanatocycloalkyl isocyanurates, which constitute cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8.

2) Polyisocyanates containing uretdione groups and having aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates. The polyisocyanates containing uretdione groups are obtained in the context of this invention as a mixture with other polyisocyanates, more particularly those specified under 1). For this purpose the diisocyanates can be reacted under reaction conditions under which not only uretdione groups but also the other polyisocyanates are formed, or the uretdione groups are formed first of all and are subsequently reacted to give the other polyisocyanates, or the diisocyanates are first reacted to give the other polyisocyanates, which are subsequently reacted to give products containing uretdione groups.

3) Polyisocyanates containing biuret groups and having aromatically, cyclo-aliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 22% by weight and an average NCO functionality of 2.8 to 6.

4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of diisocyanate, such as of hexamethylene diisocyanate or of isophorone diisocyanate, with mono- or polyhydric alcohols (A). These polyisocyanates containing urethane and/or allophanate groups generally have an NCO content of 12% to 24% by weight and an average NCO functionality of 2.5 to 4.5. Polyisocyanates of this kind containing urethane and/or allophanate groups may be prepared without catalyst or, preferably, in the presence of catalysts, such as ammonium carboxylates or ammonium hydroxides, for example, or allophanatization catalysts, such as Zn(II) compounds, for example, in each case in the presence of monohydric, dihydric or polyhydric, preferably monohydric, alcohols.

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.
8) Carbodiimide-modified polyisocyanates.
9) Hyperbranched polyisocyanates, of the kind known for example from DE-A1 10013186 or DE-A1 10013187.
10) Polyurethane-polyisocyanate prepolymers, from di- and/or polyisocyanates with alcohols.
11) Polyurea-polyisocyanate prepolymers.
12) The polyisocyanates 1)-11), preferably 1), 3), 4) and 6), can be converted, following their preparation, into polyisocyanates containing biuret groups or urethane/allophanate groups and having aromatically, cycloaliphatically or aliphatically attached, preferably (cyclo)aliphatically attached, isocyanate groups. The formation of biuret groups, for example, is accomplished by addition of water or by reaction with amines. The formation of urethane and/or allophanate groups is accomplished by reaction with monohydric, dihydric or polyhydric, preferably monohydric, alcohols, in the presence, optionally, of suitable catalysts. These polyisocyanates containing biuret or urethane/allophanate groups generally have an NCO content of 18% to 22% by weight and an average NCO functionality of 2.8 to 6.
13) Hydrophilically modified polyisocyanates, i.e., polyisocyanates which as well as the groups described under 1-12 also comprise groups which result formally from addition of molecules containing NCO-reactive groups and hydrophilizing groups to the isocyanate groups of the above molecules. The latter groups are nonionic groups such as alkylpolyethylene oxide and/or ionic groups derived from phosphoric acid, phosphonic acid, sulfuric acid or sulfonic acid, and/or their salts.
14) Modified polyisocyanates for dual cure applications, i.e., polyisocyanates which as well as the groups described under 1-13 also comprise groups resulting formally from addition of molecules containing NCO-reactive groups and UV-crosslinkable or actinic-radiation-crosslinkable groups to the isocyanate groups of the above molecules. These molecules are, for example, hydroxyalkyl (meth) acrylates and other hydroxy-vinyl compounds.

The diisocyanates or polyisocyanates recited above may also be present at least partly in blocked form.

Classes of compounds used for blocking are described in D. A. Wicks, Z. W. Wicks, Progress in Organic Coatings, 36, 148-172 (1999), 41, 1-83 (2001) and also 43, 131-140 (2001).

Examples of classes of compounds used for blocking are phenols, imidazoles, triazoles, pyrazoles, oximes, N-hydroxyimides, hydroxybenzoic esters, secondary amines, lactams, CH-acidic cyclic ketones, malonic esters or alkyl acetoacetates.

In one preferred embodiment of the present invention the polyisocyanate (A) is selected from the group consisting of isocyanurates, iminooxadiazinediones, biurets, urethanes, and allophanates, preferably from the group consisting of isocyanurates, urethanes, and allophanates, more preferably from the group consisting of isocyanurates and allophanates; in particular it is a polyisocyanate containing isocyanurate groups.

In one particularly preferred embodiment the polyisocyanate (A) encompasses polyisocyanates comprising isocyanurate groups and obtained from 1,6-hexamethylene diisocyanate.

In one further particularly preferred embodiment the polyisocyanate (A) encompasses a mixture of polyisocyanates comprising isocyanurate groups and obtained from isophorone diisocyanate and from 1,6-hexamethylene diisocyanate.

In one possible embodiment the polyisocyanate (A) is a mixture comprising low-viscosity polyisocyanates, preferably polyisocyanates comprising isocyanurate groups, with a viscosity of 600-1500 mPa*s, more particularly below 1200 mPa*s, low-viscosity urethanes and/or allophanates having a viscosity of 200-1600 mPa*s, more particularly 600-1500 mPa*s, and/or polyisocyanates comprising iminooxadiazinedione groups.

In this specification, unless noted otherwise, the viscosity is reported at 23° C. in accordance with DIN EN ISO 3219/A.3 in a cone/plate system with a shear rate of 1000 $s^{-1}$.

The process for preparing the polyisocyanates may take place as described in WO 2008/068198, especially from page 20 line 21 to page 27 line 15 therein, which is hereby made part of the present specification by reference.

The reaction can be discontinued, for example, as described therein from page 31 line 19 to page 31 line 31, and working up may take place as described therein from page 31 line 33 to page 32 line 40, which in each case is hereby part of the present specification by reference.

The reaction can alternatively be discontinued as described in WO 2005/087828 from page 11 line 12 to page 12 line 5, which is hereby part of the present specification by reference.

In the case of thermally labile catalysts it is also possible, furthermore, to discontinue the reaction by heating the reaction mixture to a temperature above at least 80° C., preferably at least 100° C., more preferably at least 120° C. Generally it is sufficient for this purpose to heat the reaction mixture, in the way which is necessary at the working-up stage in order to separate the unreacted isocyanate, by distillation.

In the case both of thermally non-labile catalysts and of thermally labile catalysts, the possibility exists of terminating the reaction at relatively low temperatures by addition of deactivators. Examples of suitable deactivators are hydrogen chloride, phosphoric acid, organic phosphates, such as dibutyl phosphate or diethylhexyl phosphate, carbamates such as hydroxyalkyl carbamate, or organic carboxylic acids.

These compounds are added neat or diluted in a suitable concentration as necessary to discontinue the reaction.

Component (B): At least one hydroxyl-containing poly (meth)acrylate polyol

Component (B) comprises at least one, one to four for example, preferably one to three, more preferably one to two, and very preferably precisely one poly(meth)acrylate polyol. These compounds are usually copolymers of essentially (meth)acrylic esters, examples being $C_1$-$C_{20}$ alkyl (meth) acrylates, with hydroxyalkyl (meth)acrylates, examples being the mono(meth)acrylic esters of 1,2-propanediol, ethylene glycol, 1,3-propanediol, 1,4-butanediol or 1,6-hexanediol.

They preferably have a molecular weight $M_n$ (number average) as determinable by gel permeation chromatography of 500 to 50 000, more particularly 1000 to 10 000 g/mol and a hydroxyl number of 16.5 to 264, preferably 33 to 165 mg KOH/g resin solids.

Preferred components (B) have OH numbers, measured to DIN 53240-2, of 15-250 mg KOH/g resin solids, preferably 80-160 mg KOH/g.

Additionally the binders (B) may have an acid number to DIN EN ISO 3682 of up to 200 mg KOH/g, preferably up to 150 and more preferably up to 100 mg KOH/g.

The components (B) preferably have a molecular weight $M_n$ of at least 1000, more preferably at least 2000, and very preferably at least 5000 g/mol. There may in principle be no upper limit molecular weight $M_n$; it is preferably up to 200 000, more preferably up to 100 000, and very preferably up to 50 000 g/mol.

In the copolymerization the hydroxyl-containing monomers are used in amounts such as to result in, for the polymers, the abovementioned hydroxyl numbers, which, incidentally, correspond generally to a hydroxyl group content in the polymers of 0.5% to 8%, preferably 1% to 5% by weight. In general the hydroxy-functional comonomers are used in amounts of 3% to 75%, preferably 6% to 47% by weight, based on the total weight of the monomers employed. In addition it must of course be ensured that, within the context of the details given, the amount of the hydroxy-functional monomers is selected such as to form copolymers which contain on average per molecule at least two hydroxyl groups.

Examples of monomers include $C_1$-$C_{20}$ alkyl (meth)acrylates, vinylaromatics having up to 20 C atoms, vinyl esters of carboxylic acids comprising up to 20 C atoms, ethylenically unsaturated nitriles, vinyl ethers of alcohols comprising 1 to 10 C atoms, $\alpha,\beta$-unsaturated carboxylic acids and their anhydrides, and aliphatic hydrocarbons having 2 to 8 C atoms and 1 or 2 double bonds.

Preferred (meth)acrylic acid alkyl esters are those having a $C_1$-$C_{10}$ alkyl radical, such as methyl methacrylate, methyl acrylate, n-butyl acrylate, ethyl acrylate and 2-ethylhexyl acrylate.

Mixtures of the (meth)acrylic acid alkyl esters as well are particularly suitable.

Vinyl esters of carboxylic acids having 1 to 20 C atoms are, for example, vinyl laurate, vinyl stearate, vinyl propionate and vinyl acetate.

Examples of possible $\alpha,\beta$-unsaturated carboxylic acids and their anhydrides include acrylic acid, methacrylic acid, fumaric acid, crotonic acid, itaconic acid, maleic acid or maleic anhydride, preferably acrylic acid.

Hydroxy-functional monomers include monoesters of $\alpha,\beta$-unsaturated carboxylic acids such as acrylic acid and methacrylic acid (referred to for short in this specification as "(meth)acrylic acid") with diols or polyols that have preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, polyTHF having a molar weight between 162 and 4500, preferably 250 to 2000, poly-1,3-propanediol or polypropylene glycol having a molar weight between 134 and 2000 or polyethylene glycol having a molar weight between 238 and 2000.

Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and particular preference to 2-hydroxyethyl acrylate and 2-hydroxyethyl methacrylate.

Examples of suitable vinylaromatic compounds include vinyltoluene, $\alpha$-butylstyrene, 4-n-butylstyrene, 4-n-decylstyrene, and—preferably—styrene.

Examples of nitriles are acrylonitrile and methacrylonitrile.

Examples of suitable vinyl ethers are vinyl methyl ether, vinyl isobutyl ether, vinyl hexyl ether, and vinyl octyl ether.

Nonaromatic hydrocarbons having 2 to 8 C atoms and one or two olefinic double bonds include butadiene, isoprene, and also ethylene, propylene, and isobutylene.

Additionally it is possible to use N-vinylformamide, N-vinylpyrrolidone, and N-vinylcaprolactam, and also ethylenically unsaturated acids, especially carboxylic acids, acid anhydrides or acid amides, and also vinylimidazole. Comonomers containing epoxide groups as well, such as glycidyl acrylate or methacrylate, for example, or monomers such as N-methoxymethylacrylamide or -methacrylamide, can be used as well in small amounts.

Preference is given to esters of acrylic acid and/or of methacrylic acid having 1 to 18, preferably 1 to 8, carbon atoms in the alcohol residue, such as methyl acrylate, ethyl acrylate, isopropyl acrylate, n-propyl acrylate, n-butyl acrylate, 2-ethylhexyl acrylate, n-stearyl acrylate, the methacrylates corresponding to these acrylates, styrene, alkyl-substituted styrenes, acrylonitrile, methacrylonitrile, vinyl acetate or vinyl stearate, or any desired mixtures of such monomers.

The monomers bearing hydroxyl groups are used, in the copolymerization of the (meth)acrylates bearing hydroxyl groups, in a mixture with other polymerizable monomers, preferably free-radically polymerizable monomers, preferably those which are composed to an extent of more than 50% by weight of $C_1$-$C_{20}$, preferably $C_1$ to $C_4$, alkyl (meth)acrylate, (meth)acrylic acid, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures thereof. Particularly preferred polymers are those which besides the monomers bearing hydroxyl groups are composed to an extent of more than 60% by weight of $C_1$-$C_{10}$ alkyl (meth)acrylates, styrene and its derivatives, or mixtures thereof.

The polymers can be prepared by polymerization, by conventional methods. Preferably the polymers are prepared in an emulsion polymerization or in organic solution. Continuous or discontinuous polymerization processes are possible. The discontinuous processes include the batch process and the feed process, the latter being preferred. With the feed process, the solvent is introduced as an initial charge, on its own or with a portion of the monomer mixture, this initial charge is heated to the polymerization temperature, the polymerization is initiated free-radically in the case of an initial monomer charge, and the remaining monomer mixture is metered in, together with an initiator mixture, in the course of 1 to 10 hours, preferably 3 to 6 hours. Subsequently, and optionally, the batch is reactivated, in order to carry through the polymerization to a conversion of at least 99%.

Examples of suitable solvents include aromatics, such as solvent naphtha, benzene, toluene, xylene, chlorobenzene, esters such as ethyl acetate, butyl acetate, methylglycol acetate, ethylglycol acetate, methoxypropyl acetate, ethers such as butylglycol, tetrahydrofuran, dioxane, ethylglycol ether, ketones such as acetone, methyl ethyl ketone, and halogenated solvents such as methylene chloride or trichloromonofluoroethane.

Component (C): At least one hyperbranched polyesterol

Component (C) comprises at least one, one to four for example, preferably one to three, more preferably one to two, and very preferably precisely one high-functionality highly branched or hyperbranched polyester polyol having a molecular weight $M_n$ of at least 500 g/mol and a polydispersity $M_w/M_n$ of 1.2-50, either obtainable by polycondensation of at least one dicarboxylic acid $A_2$ or derivatives thereof, optionally of at least one tri-functional or higher polyfunctional carboxylic acid $A_x$ with x≥3 or derivatives thereof, and at least one tri-functional or higher polyfunctional alcohol $B_y$ with y≥3, and also optionally at least one diol $B_2$, preferably in the absence of diol $B_2$, or obtainable by polycondensation of at least one tri-functional or higher polyfunctional carboxylic acid $A_x$ with x≥3 or derivatives thereof, optionally at least one dicarboxylic acid $A_2$ or derivatives thereof, preferably in the absence of a dicarboxylic acid $A_2$ or derivatives thereof, and at least one diol $B_2$, and also optionally at least one tri-functional or higher polyfunctional alcohol $B_y$ with y≥3.

The term "in the absence" in the context of this specification means that less than 20 mol % of all of the OH groups of the hydroxyl-containing building blocks $B_y$ and $B_2$ originate from difunctional alcohols $B_2$, preferably less than 10 mol %, more preferably less than 5 mol %, and very preferably 0 mol %.

The same also applies, analogously, to the acid component $A_2$.

The polyester polyols (C) generally have a viscosity of not more than 100 Pa×s (measured at 80° C. to DIN EN 3219).

The polyester polyols (C) possess a sum of acid number and OH number to DIN 53240 Part 2 of up to 600 mg KOH/g.

The OH number is preferably 100 to 500, more preferably 150 to 450, and very preferably 150 to 400 mg KOH/g.

Preferably the acid number is not more than 100, more preferably 5 to 100, and very preferably 10 to 90 mg KOH/g.

The polyester polyols (C) generally have a glass transition temperature of −60 to 100° C., preferably −50 to 90° C., and more preferably −40 to 80° C.

The polyesterols (C) have a molecular weight $M_n$ of at least 500, preferably at least 600, and more preferably 750 g/mol. The upper limit of the molecular weight $M_n$ is preferably 100 000 g/mol; with particular preference $M_n$ is not more than 80 000 and very preferably not more than 30 000 g/mol.

The figures for the polydispersity and for the number-average and weight-average molecular weights $M_n$ and $M_w$ refer here to measurements made by gel permeation chromatography using polymethyl methacrylate as standard and tetrahydrofuran or hexafluoroisopropanol as eluent. The method is described in Analytiker Taschenbuch, Vol. 4, pages 433 to 442, Berlin 1984.

The polydispersity of the polyesterols (C) is 1.2 to 50, preferably 1.4 to 40, more preferably 1.5 to 30, and very preferably up to 10.

Hyperbranched polyesters for the purposes of this invention are noncrosslinked polyesters having hydroxyl and optionally carboxyl groups, which are both structurally and molecularly nonuniform. The polyesterols are preferably noncrosslinked, which in the context of this specification means that there is a degree of crosslinking of less than 15% by weight, preferably of less than 10% by weight, determined by way of the insoluble fraction of the polymer.

The insoluble fraction of the polymer was determined by extraction for four hours using the same solvent as employed for the gel permeation chromatography, in other words tetrahydrofuran or hexafluoroisopropanol, depending on what solvent has better solvency for the polymer, in a Soxhlet apparatus, and by drying of the residue to constant weight and weighing of the remaining residue.

The polyesterols (C) typically have very good solubility, i.e., it is possible to prepare solutions which are clear at 25° C. and contain up to 50%, in certain cases even up to 80%, by weight of the polyesters of the invention in tetrahydrofuran (THF), ethyl acetate, n-butyl acetate, ethanol, and numerous other solvents, without gel particles being detectable by the naked eye. This shows the low degree of crosslinking of the polyesters of the invention.

Hyperbranched polyesters may on the one hand be synthesized starting from a central molecule in the same way as for dendrimers but with the chain length between the possible branching points being nonuniform. On the other hand they can also be of linear construction, with functional side groups, or else, as a combination of the two extremes, may include linear and branched moieties. On the definition of dendrimeric and hyperbranched polymers see also P. J. Flory, J. Am. Chem. Soc. 1952, 74, 2718 and H. Frey et al., Chemistry—A European Journal, 2000, 6, No. 14, 2499.

By "hyperbranched" in connection with the present invention is meant that the degree of branching (DB), in other words the average number of dendritic linkages plus the average number of end groups per molecule, is 10% to 99.9%, preferably 20% to 99%, more preferably 20%-95%. By "dendrimeric" in the context of the present invention is meant that the degree of branching is 99.9%-100%. On the definition of "the degree of branching" see H. Frey et al., Acta Polym. 1997, 48, 30-35.

Details of the building blocks now follow:

The dicarboxylic acids ($A_2$) include for example aliphatic dicarboxylic acids, such as oxalic acid, malonic acid, succinic acid, glutaric acid, adipic acid, pimelinic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid. It is also possible additionally to use aromatic dicarboxylic acids, such as phthalic acid, isophthalic acid or terephthalic acid, for example. Unsaturated dicarboxylic acids as well, such as maleic acid or fumaric acid, can be used, albeit less preferably.

Said dicarboxylic acids may also be substituted by one or more radicals selected from $C_1$-$C_{20}$ alkyl groups, such as methyl, ethyl, n-propyl, isopropyl, n-butyl, isobutyl, sec-butyl, tert-butyl. n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, trimethylpentyl, n-nonyl or n-decyl, n-dodecyl, n-octadecyl and n-eicosyl, for example, $C_3$-$C_{12}$ cycloalkyl groups, such as cyclopropyl, cyclobutyl, cyclopentyl, cyclohexyl, cycloheptyl, cyclooctyl, cyclononyl, cyclodecyl, cycloundecyl and cyclododecyl, for example; preference is given to cyclopentyl, cyclohexyl and cycloheptyl;

Alkylene groups such as methylene or ethylidene or $C_6$-$C_{14}$ aryl groups such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, for example, preferably phenyl, 1-naphthyl and 2-naphthyl, more preferably phenyl.

Exemplary representatives of substituted dicarboxylic acids that may be mentioned include the following: 2-methylmalonic acid, 2-ethylmalonic acid, 2-phenylmalonic acid, 2-methylsuccinic acid, 2-octadecenylsuccinic acid and its anhydride (see below), 2-ethylsuccinic acid, 2-phenylsuccinic acid, itaconic acid, 3,3-dimethylglutaric acid.

It is also possible to use mixtures of two or more of the aforementioned dicarboxylic acids.

The dicarboxylic acids can be used either as such or in the form of derivatives.

By derivatives are meant preferably
the corresponding anhydrides in monomeric or else polymeric form,
monoalkyl or dialkyl esters, preferably mono- or di-$C_1$-$C_4$ alkyl esters, more preferably monomethyl or dimethyl esters or the corresponding monoethyl or diethyl esters,
additionally monovinyl and divinyl esters, and also mixed esters, preferably mixed esters with different $C_1$-$C_4$ alkyl components, more preferably mixed methyl ethyl esters.

$C_1$-$C_4$ alkyl for the purposes of this specification means methyl, ethyl, isopropyl, n-propyl, n-butyl, isobutyl, sec-butyl and tert-butyl, preferably methyl, ethyl and n-butyl, more preferably methyl and ethyl and very preferably methyl.

It is also possible to use a mixture of a dicarboxylic acid and one or more of its derivatives. Likewise possible within the context of the present invention is to use a mixture of two or more different derivatives of one or more dicarboxylic acids.

Particular preference is given to using malonic acid, sebacic acid, succinic acid, glutaric acid, adipic acid, 1,2-, 1,3- or 1,4-cyclohexanedicarboxylic acid (hexahydrophthalic acids), phthalic acid, isophthalic acid, terephthalic acid or the monoalkyl or dialkyl esters thereof as building blocks $A_2$.

Sebacic, adipic and 1,2- and 1,4-cyclohexanedicarboxylic acids are especially preferred.

Examples of tricarboxylic or polycarboxylic acids ($A_x$) that can be reacted include aconitic acid, 1,3,5-cyclohexanetricarboxylic acid, 1,2,4-benzenetricarboxylic acid, 1,3,5-benzenetricarboxylic acid, 1,2,4,5-benzenetetracarboxylic acid (pyromellitic acid) and also mellitic acid and low molecular weight polyacrylic acids.

The index "x" here stands for the functionality in terms of carboxyl groups represented by "A"; it is governed by $x \geq 3$, preferably $x=3$ or 4 and more preferably $x=3$.

Tricarboxylic acids or polycarboxylic acids ($A_x$) can be used in the reaction according to the invention either as such or else in the form of derivatives.

By derivatives are meant preferably
the corresponding anhydrides in monomeric or else polymeric form,
mono-, di- or trialkyl esters, preferably mono-, di- or tri-$C_1$-$C_4$ alkyl esters, more preferably mono-, di- or trimethyl esters or the corresponding mono-, di- or triethyl esters,
additionally mono-, di- and trivinyl esters, and also
mixed esters, preferably mixed esters having different $C_1$-$C_4$ alkyl components, more preferably mixed methyl ethyl esters.

Within the context of the present invention it is also possible to use a mixture of a tricarboxylic or polycarboxylic acid and one or more of its derivatives, such as a mixture of pyromellitic acid and pyromellitic dianhydride, for example. It is likewise possible within the context of the present invention to use a mixture of two or more different derivatives of one or more tricarboxylic or polycarboxylic acids, such as a mixture of 1,3,5-cyclohexanetricarboxylic acid and pyromellitic dianhydride, for example.

Diols ($B_2$) used in accordance with the present invention include for example ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane,-1,2-diol. 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)-cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, n being an integer and $n \geq 4$, polyethylene-polypropylene glycols, the sequence of the ethylene oxide or propylene oxide units being blockwise or random, polytetramethylene glycols, preferably with a molar weight of up to 5000 g/mol, poly-1,3-propanediols, preferably with a molar weight up to 5000 g/mol, polycaprolactones, or mixtures of two or more representatives of the above compounds. Either one or both hydroxyl groups in the abovementioned diols may be substituted by SH groups. Diols whose use is preferred are ethylene glycol, 1,2-propanediol, 1,3-propanediol, 1,4-butanediol, 1,5-pentanediol, 1,6-hexanediol, 1,8-octanediol, 1,2-, 1,3- and 1,4-cyclohexanediol, 1,3- and 1,4-bis(hydroxymethyl)-cyclohexane, and diethylene glycol, triethylene glycol, dipropylene glycol and tripropylene glycol.

The dihydric alcohols $B_2$ may optionally also comprise further functionalities such as carbonyl, carboxyl, alkoxycarbonyl or sulfonyl, for example, such as dimethylolpropionic acid or dimethylolbutyric acid, for example, and also their $C_1$-$C_4$ alkyl esters, though preferably the alcohols $B_2$ contain no further functionalities.

Alcohols with a functionality of at least three ($B_y$) comprise glycerol, trimethylol-methane, trimethylolethane, trimethylolpropane, 1,2,4-butanetriol, tris(hydroxymethyl)-amine, tris(hydroxyethyl)amine, tris(hydroxypropyl)amine, pentaerythritol, diglycerol, triglycerol or higher condensates of glycerol, di(trimethylolpropane), di(pentaerythritol), trishydroxymethyl isocyanurate, tris(hydroxyethyl) isocyanurate (THEIC), tris(hydroxy-propyl) isocyanurate, inositols or sugars, such as glucose, fructose or sucrose, for example, sugar alcohols such as sorbitol, mannitol, threitol, erythritol, adonitol (ribitol), arabitol (lyxitol), xylitol, dulcitol (galactitol), maltitol, isomalt, polyetherols with a functionality of three or more, based on alcohols with a functionality of three or more and on ethylene oxide, propylene oxide and/or butylene oxide.

The index "y" here stands for the functionality in terms of hydroxyl groups represented by "B"; it is governed by $y \geq 3$, preferably $y=3$ or 4 and more preferably $y=3$.

Particular preference is given here to glycerol, diglycerol, triglycerol, trimethylolethane, trimethylolpropane, ditrimethylolpropane, 1,2,4-butanetriol, pentaerythritol, tris(hydroxyethyl) isocyanurate and also polyetherols thereof based on ethylene oxide and/or propylene oxide.

Very particular preference is given to glycerol, trimethylolpropane, ditrimethylolpropane and pentaerythritol.

The polyesters can be prepared in bulk or in the presence of a solvent. Examples of suitable solvents include hydrocarbons such as paraffins or aromatics. Particularly suitable paraffins are n-heptane and cyclohexane. Particularly suitable aromatics are toluene, ortho-xylene, meta-xylene, para-xylene, xylene isomer mixture, ethylbenzene, chlorobenzene and ortho- and meta-dichlorobenzene. Of further suitability as solvents in the absence of acidic catalysts are, very preferably, ethers, such as dioxane or tetrahydrofuran, for example, and ketones such as methyl ethyl ketone and methyl isobutyl ketone, for example.

The amount of solvent added is in accordance with the invention at least 0.1% by weight, based on the mass of the starting materials employed that are to be reacted, preferably at least 1% by weight and more preferably at least 10% by weight. It is also possible to use excesses of solvent, based on the mass of starting materials employed that are to be reacted, such as from 1.01 to 10 times. Solvent amounts of more than 100 times, based on the mass of starting materials employed that are to be reacted, are not advantageous, since at significantly lower reactant concentrations the reaction rate subsides significantly, leading to uneconomically long reaction times.

In one preferred embodiment the reaction is carried out free from solvent.

To carry out the process it is possible to operate in the presence of a water-removing agent, as an additive added at the beginning of the reaction. Suitable examples include molecular sieves, especially molecular sieve 4A, $MgSO_4$ and $Na_2SO_4$. It is also possible during the reaction to add further water remover or to replace water remover by fresh water remover. It is also possible to remove water and/or alcohol formed, during the reaction, by distillation and, for example, to use a water separator, in which case the water is removed with the aid of an azeotrope former.

Separation may also take place by stripping: for example, by passing a gas which is inert under the reaction conditions through the reaction mixture, additionally, optionally, to a distillation. Suitable inert gases include preferably nitrogen, noble gases, carbon dioxide or combustion gases.

The process can be carried out in the absence of catalysts. It is preferred, however, to operate in the presence of at least one catalyst. These are preferably acidic inorganic, organometallic or organic catalysts or mixtures of two or more acidic inorganic, organometallic or organic catalysts.

Acidic inorganic catalysts for the purposes of the present invention are for example sulfuric acid, sulfates and hydrogen sulfates, such as sodium hydrogen sulfate, phosphoric acid, phosphonic acid, hypophosphorous acid, aluminum sulfate hydrate. alum, acidic silica gel (pH≤6, especially ≤5) and acidic aluminum oxide. Further acidic inorganic catalysts which can be used include, for example, aluminum compounds of the general formula $Al(OR^3)_3$ and titanates of the general formula $Ti(OR^3)_4$, it being possible for the radicals $R^3$ to be identical or different in each case and to be selected independently of one another from $C_1$-$C_{20}$ alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl, for example, $C_3$-$C_{12}$ cycloalkyl radicals, such as cyclopropyl, cyclobutyl, cyclopentyl, cyclohexyl, cycloheptyl, cyclooctyl, cyclononyl, cyclodecyl, cycloundecyl and cyclododecyl, for example; preferably cyclopentyl, cyclohexyl and cycloheptyl.

The radicals $R^3$ in $Al(OR^3)_3$ and/or $Ti(OR^3)_4$ are preferably each identical and selected from n-butyl, isopropyl and 2-ethylhexyl.

Preferred acidic organometallic catalysts are chosen for example from dialkyltin oxides $R^3_2SnO$ or dialkyltin esters $R^3_2Sn(OR^4)_2$, in which $R^3$ is as defined above and can be identical or different.

$R^4$ can have the same definitions as $R^3$ and additionally can be $C_6$-$C_{12}$ aryl: phenyl, o-, m- or p-tolyl, xylyl or naphthyl, for example. $R^4$ can in each case be identical or different.

Examples of organotin catalysts are tin(II) n-octanoate, tin(II) 2-ethylhexanoate, tin(II) laurate, dibutyltin oxide, diphenyltin oxide, dibutyltin dichloride, dibutyltin diacetate, dibutyltin dilaurate, dibutyltin dimaleate or dioctyltin diacetate.

Particularly preferred representatives of acidic organometallic catalysts are dibutyltin oxide, diphenyltin oxide and dibutyltin dilaurate.

Preferred acidic organic catalysts are acidic organic compounds containing, for example, phosphate groups, sulfonic acid groups, sulfate groups or phosphonic acid groups. Particular preference is given to sulfonic acids such as para-toluenesulfonic acid, for example. Acidic ion exchangers can also be used as acidic organic catalysts, examples being polystyrene resins which contain sulfonic acid groups and have been crosslinked with about 2 mol % of divinylbenzene.

Combinations of two or more of the aforementioned catalysts can also be employed. A further possibility is to use organic or organometallic or else inorganic catalysts that are in the form of discrete molecules in an immobilized form, on silica gel or on zeolites, for example.

If it is desired to use acidic inorganic, organometallic or organic catalysts then the amount of catalyst used is in accordance with the invention from 0.1% to 10% by weight, preferably from 0.2% to 2% by weight.

Enzymes or their decomposition products are not included among the acidic organic catalysts for the purposes of the present invention. Likewise the dicarboxylic acids reacted in accordance with the invention are not included among the acidic organic catalysts for the purposes of the present invention.

For carrying out the process of the invention it is advantageous to forego the use of enzymes.

The process of the invention is carried out preferably under an inert gas atmosphere, i.e., a gas which is inert under the reaction conditions, such as under carbon dioxide, combustion gases, nitrogen or noble gas, for example, among which argon may be mentioned in particular.

The process is carried out at temperatures from 60 to 250° C. It is preferred to operate at temperatures from 80 to 200° C., more preferably at 100 to 180° C.

The pressure conditions of the process of the invention are not generally critical. It is possible to operate at a significantly reduced pressure, such as at from 10 to 500 mbar, for example. The process of the invention can also be carried out at pressures above 500 mbar. Preference is given, on grounds of simplicity, to reaction at atmospheric pressure; also possible, however, is its implementation at a slightly elevated pressure, up to 1200 mbar for example. It is also possible to operate under significantly increased pressure, at pressures of up to 10 bar, for example. Reaction under reduced or atmospheric pressure is preferred, particular preference being given to atmospheric pressure.

The reaction time of the process of the invention is normally from 10 minutes to 48 hours, preferably from 30 minutes to 24 hours and more preferably from 1 to 12 hours.

After the end of the reaction the high-functionality highly branched and hyperbranched polyesters can be isolated easily, by for example filtering off the catalyst and stripping off the solvent if desired, in which case the stripping of the solvent is normally carried out under reduced pressure. Further highly suitable workup methods are precipitation of the polymer following addition of water and subsequent washing and drying.

The further workup of the reaction mixture can take place, for example, as described in WO 2005/118677 A1, particularly from page 13 line 18 to page 17 line 5 therein, which is hereby part of the present description by reference.

In a further preferred embodiment the polyesters of the invention may contain further functional groups in addition to the functional groups already obtained by virtue of the reaction. Functionalization in this context may take place during the buildup of molecular weight or else subsequently, i.e., after the end of the actual reaction, preferably subsequently. This means that the conversion of components $A_2$, $B_2$, $A_x$ and/or $B_y$ is concluded at least 75%, preferably at least 80%, more preferably at least 85%, very preferably at least 90%, in particular at least 95% and especially at least 97%. Functionalization with saturated or unsaturated monocarboxylic acids during the molecular weight buildup is ruled out preferably.

If, before or during the molecular weight buildup, components are added which as well as hydroxyl or carboxyl groups possess further functional groups or functional elements, then a polyester polymer is obtained which has randomly distributed functionalities different from the carboxyl or hydroxyl groups.

Functional groups may for example additionally be ether groups, carbonate groups, urethane groups, urea groups, thiol groups, thioether groups, thioester groups, keto or aldehyde groups, mono-, di- or trisubstituted amino groups, nitrile or isonitrile groups, carboxamide groups, sulfonamide groups, silane groups or siloxane groups, sulfonic acid, sulfenic acid or sulfinic acid groups, phosphonic acid groups, vinyl or allyl groups or lactone groups.

Effects of this kind can be obtained, for example, by adding functionalized building blocks E as compounds during the polycondensation which besides hydroxyl groups or carboxyl groups carry further functional groups or functional elements, such as mercapto groups, primary, secondary or tertiary amino groups, ether groups, carbonyl groups, sulfonic acids or derivatives of sulfonic acids, sulfinic acids or derivatives of sulfinic acids, phosphonic acids or derivatives of phosphonic acids, phosphinic acids or derivatives of phosphinic acids, silane groups, siloxane groups. For modification by means of amide groups it is possible to make additional use during the esterification of, for example, ethanolamine, propanolamine, isopropanolamine, 2-(butylamino)ethanol, 2-(cyclohexylamino)ethanol, 2-amino-1-butanol, 2-(2"-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)-aminomethane, tris(hydroxyethyl)aminomethane, ethylenediamine, propylenediamine, hexamethylenediamine or isophoronediamine.

For modification with mercapto groups it is possible for example to use mercaptoethanol. Tertiary amino groups can be generated, for example, by incorporating N-methyldiethanolamine, N-methyldipropanolamine or N,N-dimethylethanolamine. Ether groups can be produced, for example, by condensing in polyetherols with a functionality of two or more. Reaction with long-chain alkanediols allows the introduction of long-chain alkyl radicals, while reaction with alkyl or aryl diisocyanates generates alkyl-, aryl- and urethane-functional polyesters.

Subsequent functionalization is obtainable by reacting the resultant high-functionality highly branched or hyperbranched polyester in an additional process step with a suitable functionalizing reagent which is able to react with the OH and/or carboxyl groups of the polyester.

Functionalization of hydroxyl-containing polyesters of the invention with saturated or unsaturated, aliphatic, cycloaliphatic, araliphatic or aromatic monocarboxylic acids F can preferably take place only subsequently, i.e., after the end of the actual reaction, in a separate step.

Suitable saturated monocarboxylic acids F may comprise 1 to 30 carbon atoms, preferably 2 to 30, more preferably 4 to 25, very preferably 6 to 20, and in particular 8 to 20 carbon atoms.

Examples of suitable saturated monocarboxylic acids F are formic acid, acetic acid, propionic acid, butyric acid, pivalic acid, caproic acid, 2-ethylhexanoic acid, octanoic acid, isononanoic acid, capric acid, undecanoic acid, lauric acid, myristic acid, pentadecanoic acid, palmitic acid, margaric acid, stearic acid, nonadecanoic acid, arachic acid, behenic acid, oleic acid, linoleic acid, linolenic acid, benzoic acid and or β-naphthoic acid.

Suitable α,β-unsaturated monocarboxylic acids F can comprise 3 to 20 carbon atoms, preferably 3 to 10, more preferably 3 to 6, very preferably 3 to 5 and in particular 3 to 4 carbon atoms.

Examples of suitable α,β-unsaturated monocarboxylic acids F are acrylic acid, methacrylic acid, ethacrylic acid, α-chloroacrylic acid, maleic acid, fumaric acid, itaconic acid, crotonic acid, citraconic acid, mesaconic acid or glutaconic acid, preferably acrylic acid, methacrylic acid, maleic acid, fumaric acid, itaconic acid and crotonic acid, more preferably acrylic acid, methacrylic acid, maleic acid, fumaric acid and crotonic acid, very preferably acrylic acid and methacrylic acid and in particular acrylic acid.

The reaction with saturated or unsaturated monocarboxylic acids F can take place with, instead of the carboxylic acids, their derivatives too, for example with their anhydrides, chlorides or esters, preferably with their anhydrides or esters, more preferably with their esters with $C_1$-$C_4$ alkyl alcohols, and very preferably with their methyl esters.

A reaction in the sense of an esterification can take place for example in the presence of at least one esterification catalyst, such as sulfuric acid, aryl- or alkylsulfonic acids or mixtures thereof, for example. Examples of arylsulfonic acids are benzenesulfonic acid, para-toluenesulfonic acid or dodecylbenzenesulfonic acid; examples of alkylsulfonic acids are methanesulfonic acid, ethanesulfonic acid or trifluoromethanesulfonic acid. Strongly acidic ion exchangers or zeolites can also be used as esterification catalysts. Preference is given to sulfuric acid and ion exchangers.

The temperature of the reaction is generally 40-160° C.; it may be sensible to remove water formed during the reaction by means of an azeotrope-forming solvent, such as n-pentane, n-hexane, n-heptane, cyclohexane, methylcyclohexane, benzene, toluene or xylene, for example.

If the water present in the reaction mixture is not removed using an azeotrope-forming solvent then it is possible to remove it by stripping with an inert gas, preferably an oxygen-containing gas, more preferably with air or lean air.

A reaction in the sense of a transesterification can take place for example in the presence of at least one transesterification catalyst, examples being metal chelate compounds of, for example, hafnium, titanium, zirconium or calcium, alkali metal alkoxides and magnesium alkoxides, organotin compounds or calcium and lithium compounds, examples being oxides, hydroxides, carbonates or halides, but preferably titanium alkoxides, magnesium alkoxides or aluminum alkoxides.

The alcohol liberated during the transesterification reaction can be removed for example by distillation, by stripping or by applying reduced pressure.

The reaction temperature amounts in general to 80-140° C.

Additionally it is also possible for high-functionality polyesters comprising hydroxyl groups to be converted, by reaction with alkylene oxides, ethylene oxide, propylene oxide or isobutylene oxide for example, into high-functionality polyester-polyether polyols. These compounds may then be obtained in water-soluble form, for example.

Component (D): Silicate particles with a size of 5 to 150 nm whose surface has been modified with an at least monoalkoxylated silyl compound (S)

The silicate particles (D) are reacted, for improved compatibility with the other components of the coating composition, on their surface with at least one, preferably precisely one, compound (S), a reaction which has the effect of improved miscibility, distribution and/or stability in the coating composition.

The silica particles (D) are obtainable, for example, by admixing an aqueous silica sol (K) having an average particle diameter of 5 to 150 nm and a silica content, calculated as $SiO_2$, of 10% to 60% by weight, at a pH of 2 to 4, with at least one compound (S) which contains at least one at least monoalkoxylated silyl group and at least one hydrophobic group, in an amount of 0.1 to 20 µmol per $m^2$ surface area of (K).

The aqueous colloidal solution (K) of polysilicic acid particles that is used (silica sol) comprises particles having an average diameter of 1 to 150 nm, preferably 2 to 120, more preferably 3 to 100, very preferably 4 to 80, more particularly 5 to 50, and especially 8 to 40 nm.

The content of silica, calculated as $SiO_2$, is from 10% to 60% by weight, preferably from 20% to 55% by weight, particularly preferably from 25% to 40% by weight. It is also possible to use silica sols having a lower content, but the additional content of water must then be separated off by distillation in a subsequent step.

The aqueous solutions (K) are colloidal solutions of polysilicic acid which, optionally, can be stabilized to a slight extent with alkali metal, alkaline earth metal, ammonium, aluminum, iron(II), iron(III) and/or zirconium ions, preferably alkali metal, alkaline earth metal, ammonium and/or iron(III) ions, particularly preferably alkali metal, alkaline earth metal and/or ammonium ions, very particularly preferably alkali metal and/or alkaline earth metal ions and in particular alkali metal ions.

Among the alkali metal ions, sodium and/or potassium ions are preferred and sodium ions are particularly preferred.

Among the alkaline earth metal ions, magnesium, calcium and/or beryllium ions are preferred, magnesium and/or calcium ions are particularly preferred and magnesium ions are very particularly preferred.

The molar ratio of metal ions to silicon atoms in (K) is from 0:1 to 0.1:1, preferably from 0.002 to 0.04:1.

After adjustment of the pH, the silica sols (K) used have a pH of the aqueous phase of from 2 to 4, preferably from 2 to 3.

In this document, an aqueous colloidal solution is understood as meaning a solution of optionally stabilized silica particles having a mean particle diameter of from 1 to 150 nm, which in the course of storage over a period of a month at 20° C. does not settle.

In this document, a sol is understood as meaning a colloidal, incoherent (i.e., each particle is freely mobile) solution of a solid substance in water, in this case a colloidal solution of silicon dioxide in water as a silica sol.

The acidic aqueous silica sols (K) used inventively can be obtained, for example, by three different methods:

by acidification of the corresponding alkaline silica sols, by preparation from low molecular weight silicas, preferably waterglass, i.e., salt-like particles having a diameter of less than 1 nm, or by condensation of esters of low molecular weight silicas.

The aqueous solutions of alkaline silica sols have as a rule a pH of from 7 to 11, preferably from 8 to 11, particularly preferably from 8 to 10 and very particularly preferably from 9 to 10. These alkaline silica sols are commercially available and are therefore a readily available and preferred starting material for the process of the invention.

The particles in these alkaline silica sols generally have a mean particle diameter of from 1 to 150 nm, preferably from 2 to 120 nm, particularly preferably from 3 to 100 nm and very particularly preferably from 4 to 80 nm, in particular 5 to 50 nm and especially 8 to 30 nm.

The content of silica, calculated as $SiO_2$, is from 15% to 60% by weight, preferably from 20% to 55% by weight, particularly preferably from 25% to 40% by weight. Alkaline silica sols having a lower solids content can also be used, but the surplus of water must then be separated off by distillation in a subsequent step.

The alkaline silica sols can be stabilized with the abovementioned metal ions.

The molar ratio of metal ions to silicon atoms in (K) is from 0:1 to 0.1:1, preferably from 0.002 to 0.04:1.

The pH of these alkaline silica sols is as a rule at least 8, preferably from 8 to 12, particularly preferably from 8 to 11 and very particularly preferably from 8 to 10.

The preparation of the silica sols (K) to be used inventively from these alkaline silica sols is effected by establishing the desired pH in these silica sols, for example by addition of mineral acids or by addition of an ion exchanger to the alkaline silica sols.

The acidification can be effected with any desired acids, preferably with hydrochloric acid, nitric acid, phosphoric acid, sulfuric acid, acetic acid, formic acid, methylsulfonic acid, or para-toluenesulfonic acid, or by addition of an acidic ion exchanger, preferably by acidification with hydrochloric acid, nitric acid, phosphoric acid, sulfuric acid, acidic ion exchanger or acetic acid, particularly preferably with hydrochloric acid, nitric acid, acidic ion exchanger or sulfuric acid and very particularly preferably by acidification with acidic ion exchanger or sulfuric acid.

A preferred embodiment is to prepare the silica sols (K) by addition of an ion exchanger to alkaline silica sols. As a result of this, the electrolyte content in the silica sols (K) is low, for example is less than 0.2% by weight, preferably less than 0.1% by weight.

Here, electrolytes are understood as meaning inorganic ionic constituents other than silicates, hydroxides and protons. These electrolytes originating predominantly from the stabilization of the alkaline silica sols are added to the suspension for stabilizing the particles after the preparation thereof, if they are not already present in the starting material.

The preparation of the silica sols (K) from waterglass by acidification, for example with an ion exchanger, or by addition of a mineral acid is also conceivable. A waterglass preferably used for this purpose is potassium and/or sodium silicate, which particularly preferably has a ratio of 1-10 mol of $SiO_2$ to 1 mol of alkali metal oxide, very particularly preferably 1.5-6 and in particular 2-4 mol of $SiO_2$ to 1 mol of alkali metal oxide.

In this case, the reaction mixture is allowed to react until a silica sol (K) of the desired size has formed, and the process of the invention is then continued.

The low molecular weight silicas (ortho- and oligosilicic acid) are usually stable only in highly dilute aqueous solutions having a content of a few % by weight and are as a rule concentrated before further use.

Furthermore, the preparation of the silica sols (K) can be effected by condensation of esters of low molecular weight silicas. These are generally $C_1$ to $C_4$ alkyl esters, in particular ethyl esters of oligosilicic acid and in particular orthosilicic acid, which form silica sols (K) in the acidic or basic range.

For functionalizing the surface of the $SiO_2$ nanoparticles, in a preferred embodiment from 0 to 10 times, preferably from 0.2 to 5 times, particularly preferably from 0.4 to 3 times and very particularly preferably from 0.5 to 2 times the amount of water (based on the amount of the silica sol used) and from 0.1 to 20 times, preferably from 0.3 to 10 times, particularly preferably from 0.5 to 5 times and very particularly preferably from 1 to 2 times the amount (based on the amount of the silica sol used) of at least one organic solvent (L) are added to the acidified solution obtained. In a preferred embodiment, no additional water is added.

The solvent (L) can be added to the reaction mixture before or during the reaction with the silane (S), preferably before or during and particularly preferably before the reaction with the silane.

The organic solvent (L) is selected according to the following criteria: under the mixing conditions, it should have both sufficient miscibility with water and miscibility with the organic coating composition.

The miscibility with water under the reaction conditions should be at least 20% by weight (based on the prepared water/solvent mixture), preferably at least 50% by weight and particularly preferably at least 80% by weight. If the miscibility is too low, there is the danger that a gel will form from the modified silica sol or relatively large nanoparticle aggregates will separate out by flocculation.

The coating composition should be completely soluble in the solvent (L) or the water/solvent mixture.

Furthermore, the solvent (L) should have a boiling point of preferably less than 80° C. in a pressure range from atmospheric pressure to 50 hPa, so that it can be separated off easily by distillation.

In a preferred embodiment, the solvent (L) forms an azeotrope or heteroazeotrope with water under the distillation conditions, so that the distillate forms an aqueous and an organic phase after the distillation.

Examples of suitable solvents (L) are ethanol, 1-propanol, 2-propanol, 1-butanol, 2-butanol, 2-methyl-2-propanol, 1-chloro-2-propanol, cyclopentanol, cyclohexanol, 1,4-dioxane, tetrahydrofuran, 1-methoxy-2-propanol, 1-ethoxy-2-propanol, 2-ethoxyethanol, 2-methyl-2-propanol, 2-methoxyethanol, dimethylformamide, acetonitrile and acetone.

In a possible preferred embodiment, water and solvent (L) are added simultaneously to the solution of the silicate, and it may also be expedient to add water and solvent (L) in a form premixed with one another.

The addition of water and solvent (L) or of the mixture thereof can be effected in one go, in portions or continuously.

By means of this measure, agglomeration of the silicate particles can be reduced or preferably even prevented, depending on the pretreatment of the sols.

In order to effect modification, at least one compound (S) which has at least one, preferably exactly one, at least monoalkoxylated, for example, mono- to trialkoxylated, preferably exactly trialkoxylated, silyl group and at least one, preferably exactly one, group $R^2$ which improves the compatibility with the other components of the coating composition is also added to the reaction mixture.

The compounds (S) are preferably compounds of the formula

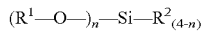

$$(R^1-O-)_n-Si-R^2_{(4-n)}$$

in which
$R^1$ is $C_1$ to $C_{20}$ alkyl, preferably $C_1$ to $C_4$ alkyl, and
n is an integer from 1 to 3, preferably 3.

$R^2$ in the formula is an organic radical comprising 1 to 20 carbon atoms which increases the compatibility with the other components of the coating composition. Preferred groups in this context are those which are reactive toward the functional groups of at least one of the components, or are hydrophobic groups.

Preferred reactive groups are mercapto groups or epoxy groups.

In these cases, preferred compounds (S) are 2-(3,4-epoxycyclohexyl)ethyltriethoxysilane, 2-(3,4-epoxycyclohexyl)ethyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, 3-glycidyloxypropyltriethoxysilane or 3-glycidyloxypropyltrimethoxysilane.

With particular preference, however, the groups $R^2$ are hydrophobic groups. With very particular preference $R^2$ is $C_1$ to $C_{20}$ alkyl, $C_6$ to $C_{12}$ aryl or $C_5$ to $C_{12}$ cycloalkyl, and examples of $C_1$ to $C_{20}$ alkyl are methyl, ethyl, isopropyl, n-propyl, n-butyl, isobutyl, sec-butyl, tert-butyl, n-hexyl, n-heptyl, n-octyl, 2-ethylhexyl, n-decyl, n-dodecyl, n-tetradecyl, n-hexadecyl, n-octadecyl and n-eicosyl.

Examples of $C_1$ to $C_4$ alkyl are methyl, ethyl, isopropyl, n-propyl, n-butyl, isobutyl, sec-butyl and tert-butyl.

Preferred radicals $R^1$ are methyl, ethyl, n-butyl and tert-butyl, more preferably methyl and ethyl.

Examples of $C_5$-$C_{12}$ cycloalkyl groups are cyclopentyl, cyclohexyl, cycloheptyl, cyclooctyl, cyclononyl, cyclodecyl, cycloundecyl and cyclododecyl; preferably cyclopentyl, cyclohexyl and cycloheptyl; cyclohexyl is particularly preferred.

$C_6$-$C_{12}$ Aryl groups are, for example, phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, more preferably phenyl.

Preferably the radical $R^2$ is $C_1$ to $C_{20}$ alkyl or $C_6$-$C_{12}$ aryl, more preferably $C_1$ to $C_{20}$ alkyl, and very preferably $C_1$ to $C_4$ alkyl.

Preferred radicals $R^2$ are methyl, ethyl, isopropyl, n-propyl, n-butyl, isobutyl, sec-butyl, tert-butyl and phenyl, methyl, ethyl, n-butyl, isobutyl, tert-butyl and phenyl being particularly preferred, and isobutyl and phenyl being very particularly preferred.

Preferred compounds (S) are isooctyltrimethoxysilane, isooctyltriethoxysilane, n-butyltrimethoxysilane, n-butyltriethoxysilane, isobutyltrimethoxysilane, isobutyltriethoxysilane, phenyltrimethoxysilane and phenyltriethoxysilane.

It can be critical that the reaction of the silica sol (K) with at least one compound (S) takes place in a pH range which corresponds to the isoelectric point of the silica sol used ±one pH unit. In general, the pH is from 2 to 4.

The acidification can be effected with any desired acids, preferably with hydrochloric acid, nitric acid, phosphoric acid, sulfuric acid, acetic acid, formic acid, methylsulfonic acid, or para-toluenesulfonic acid, or by passing over acidic ion exchangers, preferably by acidification with hydrochloric acid, nitric acid, phosphoric acid, sulfuric acid, acetic acid or ion exchangers, particularly preferably with hydrochloric acid, nitric acid, sulfuric acid or ion exchangers and very particularly preferably by acidification with sulfuric acid or ion exchangers.

As a result of the reaction with the compound (S), the surface of the silica sol (K) used is modified so that the compatibility between the originally polar silica sol and the generally nonpolar coating composition is improved. At the same time, complete modification of the surface as described in WO 2006/044376 has no further advantages.

As a rule, it is therefore sufficient if (S) is used in an amount of from 0.1 to 20 µmol per m² surface area of (K), preferably 0.25 to 15 µmol, particularly preferably 0.5 to 10 µmol, and very particularly preferably 1 to 8 µmol, per m² surface area of (K).

This corresponds as a rule to an amount of from 0.01 to 5 mmol of (S) per gram of (K), preferably from 0.05 to 4 mmol of (S) per gram of (K) and particularly preferably from 0.1 to 3 mmol of (S) per gram of (K).

The reaction is preferably effected in such a way that not more than 20 mol % of the silane (S) used remains unconverted in the reaction mixture, preferably not more than 15 mol %, particularly preferably not more than 10 mol % and very particularly preferably not more than 5 mol %.

For this purpose, the reaction with (S) is carried out with stirring at a temperature of from 10 to 60° C., preferably from 20 to 50° C., particularly preferably from 20 to 40° C.

Under these reaction conditions, the reaction is allowed to continue for from 30 minutes to 48 hours, preferably from 45 minutes to 36 hours, particularly preferably from 1 to 24 hours.

The compound (S) is added in amounts of from 0.1% to 40% by weight, preferably from 0.5% to 30% by weight and particularly preferably from 1% to 20% by weight, based on the $SiO_2$ content.

In order to determine the optimum amount of compound (S) per surface area of (K), for example, the following procedure can be adopted:

First, in a systematic series, samples of (K) are reacted with amounts of (S) such that, for example, 20%, 40%, 60%, 80% and 100% of the hydroxyl groups on the surface of (K) are modified with (S). Of course, other amounts and larger or smaller intervals between the amounts are also possible in the modification of (K).

The viscosity of these samples is determined and is plotted against the amount of (S). Usually, a range in which the viscosity changes only slightly as a function of the amount of (S) and a range in which the viscosity changes considerably as a function of the amount of (S) will be found. Ideally, two branches form which, when extrapolated as straight lines, form a point of intersection which indicates the optimum amount of (S) per surface area of (K) with respect to the viscosity, if desired in a range of ±10%, preferably in a range of ±5%.

After addition of water and solvent (L) and the subsequent reaction with the silane, the silica sol (K) is as a rule present as a 3% to 30% strength by weight colloidal solution, the ratio of water to solvent (L) being as a rule from 10:90 to 90:10 (v/v), preferably from 25:75 to 75:25 and particularly preferably from 40:60 to 60:40.

Water and the organic solvent (L) are distilled off under atmospheric or reduced pressure, preferably at from 10 hPa to atmospheric pressure, particularly preferably at from 20 hPa to atmospheric pressure, very particularly preferably at from 50 hPa to atmospheric pressure and in particular at from 100 hPa to atmospheric pressure.

The temperature at which the distillation is effected depends on the boiling point of water and/or organic solvent (L) at the respective pressure.

The distillation conditions are preferably chosen so that water and the organic solvent form an azeotrope under the conditions.

Preferably, the temperature is not more than 80° C., preferably not more than 70° C.

The distillation can be effected batchwise, semicontinuously or continuously.

For example, it can be effected batchwise from a stirred tank to which, if desired, a short rectification column can be attached.

In the case of the stirred tank, the heat is supplied via internal and/or external heat exchangers of conventional design and/or double-walled heating, preferably external circulation evaporators with natural or forced circulation. The reaction mixture is thoroughly mixed in a known manner, for example by stirring, circulation by means of pumping or natural circulation.

The distillation is effected continuously, preferably by passing the distillate via a falling-film evaporator or a heat exchanger.

All distillation apparatuses known to the person skilled in the art, for example, circulation evaporators, thin-film evaporators, falling-film evaporators, wiped surface evaporators, optionally in each case with attached rectification columns, and stripping columns, are suitable as a distillation apparatus for this purpose. For example Robert evaporators or tubular or plate-type heat exchangers are suitable as heat exchangers.

The residual content of solvent (L) in the compound (D) should be less than 15% by weight, preferably less than 10%, particularly preferably less than 5%, very particularly preferably less than 3%, in particular less than 2% and especially less than 1% by weight.

The water content of the compounds (D) is preferably below 5%, more preferably below 3%, very preferably below 2%, in particular below 1%, by weight.

The two-component polyurethane coating compositions of the invention generally have a stoichiometry of isocyanate groups in (A) to isocyanate-reactive groups in (B) and (C) of 0.1:1 to 10:1, preferably 0.2:1 to 5:1, more preferably 0.3:1 to 3:1, very preferably 0.5:1 to 2:1, in particular 0.8:1 to 1.2:1, and especially 0.9:1 to 1.1:1.

The weight ratio of components (B):(C) is generally from 100:1 to 1:50, preferably from 80:1 to 1:30, more preferably from 50:1 to 1:20, very preferably from 25:1 to 1:10, in particular from 10:1 to 1:5, and especially from 3:1 to 1:2.

The fraction of silicate particles (D), calculated as $SiO_2$, in the coating composition may be at least 0.5% and up to 50% by weight, based on the sum of components (A), (B) and (C), preferably 1% to 40%, more preferably 1.5% to 30%, very preferably 2% to 25%, and in particular 2% to 15% by weight.

For the preparation of the coating compositions of the invention, polyisocyanate composition (A) and binders (B) and (C) are mixed with one another in the desired molar ratio of isocyanate groups in (A) to isocyanate-reactive groups in (B) and (C), it being possible if desired to incorporate further, typical coatings constituents by mixing. Subsequently the composition is applied to the substrate.

In one preferred embodiment, component (D) is premixed in one of components (A), (B) or (C) and these premixed components are only then mixed with the other components. With particular preference component (D) is premixed in one of components (B) or (C), very preferably in component (B).

Further, typical coatings additives (G) used in the coating compositions may be the following, for example: UV stabilizers such as UV absorbers and suitable free-radical scavengers (especially HALS compounds, hindered amine light stabilizers), activators (accelerators), drying agents, antistatic agents, flame retardants, thickeners, thixotropic agents, surface-active agents, viscosity modifiers, plasticizers or chelating agent. UV stabilizers are preferred.

Suitable UV absorbers comprise oxanilides, triazines and benzotriazole (the latter available, for example, as Tinuvin® grades from Ciba Spezialitätenchemie) and benzophenones (e.g. Chimassorb® 81 from Ciba Spezialitätenchemie). Preference is given, for example, to 95% benzenepropanoic acid, 3-(2H-benzotriazol-2-yl)-5-(1,1-dimethylethyl)-4-hydroxy-, C7-9-branched and linear alkyl esters; 5% 1-methoxy-2-propyl acetate (e.g. Tinuvin® 384) and α-[3-[3-(2H-benzotriazol-2-yl)-5-(1,1-dimethylethyl)-4-hydroxyphenyl]-1-oxopropyl]-ω-hydroxypoly(oxo-1,2-ethanediyl) (e.g. Tinuvin® 1130), in each case products, for example, of Ciba Spezialitätenchemie. DL-alpha-tocopherol, tocopherol, cinnamic acid derivatives and cyanoacrylates can likewise be used for this purpose.

These can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g. bis(2,2,6,6-tetramethyl-4-piperidyl) sebacate. They are obtainable, for example, as Tinuvin® products and Chimassorb® products from Ciba Spezialitätenchemie. Preference in joint use with Lewis acids, however, is given to those hindered amines which are N-alkylated, examples being bis(1,2,2,6,6-pentamethyl-4-piperidinyl) [[3,5-bis(1,1-dimethylethyl)-4-hydroxyphenyl]methyl]butylmalonate (e.g. Tinuvin® 144 from Ciba Spezialitätenchemie); a mixture of bis(1,2,2,6,6-pentamethyl-4-piperidinyl)sebacate and methyl(1,2,2,6,6-pentamethyl-4-piperidinyl) sebacate (e.g. Tinuvin® 292 from Ciba Spezialitätenchemie); or which are N—(O-alkylated), such as, for example, decanedioic acid, bis(2,2,6,6-tetramethyl-1-(octyloxy)-4-piperidinyl) ester, reaction products with 1,1-dimethylethyl hydroperoxyde and octane (e.g. Tinuvin® 123 from Ciba Spezialitätenchemie).

UV stabilizers are used typically in amounts of 0.1% to 5.0% by weight, based on the solid components present in the preparation.

Suitable thickeners include, in addition to free-radically (co)polymerized (co)polymers, typical organic and inorganic thickeners such as hydroxymethylcellulose or bentonite.

Chelating agents which can be used include, for example, ethylenediamineacetic acid and salts thereof and also (3-diketones.

As component (H) in addition it is possible for fillers, dyes and/or pigments to be present.

Pigments in the true sense are, according to CD Römpp Chemie Lexikon—Version 1.0, Stuttgart/New York: Georg Thieme Verlag 1995, with reference to DIN 55943, particulate "colorants that are organic or inorganic, chromatic or achromatic and are virtually insoluble in the application medium".

Virtually insoluble here means a solubility at 25° C. below 1 g/1000 g application medium, preferably below 0.5, more preferably below 0.25, very particularly preferably below 0.1, and in particular below 0.05 g/1000 g application medium.

Examples of pigments in the true sense comprise any desired systems of absorption pigments and/or effect pigments, preferably absorption pigments. There are no restrictions whatsoever on the number and selection of the pigment components. They may be adapted as desired to the particular requirements, such as the desired perceived color, for example, as described in step a), for example. It is possible for example for the basis to be all the pigment components of a standardized mixer system.

Effect pigments are all pigments which exhibit a platelet-shaped construction and give a surface coating specific decorative color effects. The effect pigments are. for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example.

The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide and carbon black.

Dyes are likewise colorants, and differ from the pigments in their solubility in the application medium; i.e., they have a solubility at 25° C. of more than 1 g/1000 g in the application medium.

Examples of dyes are azo, azine, anthraquinone, acridine, cyanine, oxazine, polymethine, thiazine and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blancfixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 µm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case.

Preferred fillers comprise silicates other than compounds (D), examples being silicates obtainable by hydrolysis of silicon tetrachloride, such as Aerosil® from Degussa, siliciceous earth, talc, aluminum silicates, magnesium silicates, calcium carbonates, etc.

The coating composition may further be admixed with at least one catalyst able to accelerate the reaction of isocyanate groups with isocyanate-reactive groups.

Compounds able to accelerate the reaction of isocyanate groups with isocyanate-reactive groups are those compounds which, by their presence in a reactant mixture, result in a higher fraction of reaction products containing urethane groups than does the same reactant mixture in their absence, under the same reaction conditions.

These compounds are known from the literature, as for example from G. Oertel (Ed.), Polyurethane, 3rd edition 1993, Carl Hanser Verlag, Munich—Vienna, pages 104 to 110, section 3.4.1. "Catalysts", preference being given to organic amines, especially tertiary aliphatic, cycloaliphatic or aromatic amines, BrØnsted acids and/or Lewis-acidic organometallic compounds; Lewis-acidic organometallic compounds are particularly preferred.

Examples of suitable Lewis-acidic organic metal compounds are tin compounds, such as tin(II) salts of organic carboxylic acids, e.g., tin(II) diacetate, tin(II) dioctoate, tin (II) bis(ethylhexanoate) and tin(II) dilaurate, and the dialkyltin(IV) salts of organic carboxylic acids, e.g., dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. In addition it is possible to use zinc(II) salts, such as zinc(II) dioctoate, for example.

Unless indicated otherwise, the carboxylic acids in question, in the case of octoate, for example, can be branched and/or unbranched isomers, preferably unbranched.

Also possible are metal complexes such as acetylacetonates of iron, of titanium, of aluminum, of zirconium, of manganese, of nickel, of zinc and of cobalt.

Further metal catalysts are described by Blank et al. in Progress in Organic Coatings, 1999, Vol. 35, pages 19-29.

Tin-free and zinc-free alternatives used include zirconium, bismuth and aluminum compounds. These are, for example, zirconium tetraacetylacetonate (e.g., K-KAT® 4205 from King Industries); zirconium dionates (e.g., K-KAT® XC-9213; XC-A 209 and XC-6212 from King Industries); bismuth compounds, especially tricarboxylates (e.g., K-KAT® 348, XC-B221; XC-C227, XC 8203 from King Industries); aluminum dionate (e.g., K-KAT® 5218 from King Industries). Tin-free and zinc-free catalysts are otherwise also offered, for example, under the trade name Borchi® Kat from Borchers. TK from Goldschmidt or BICAT® from Shepherd, Lausanne.

These catalysts are suitable for solvent-based, water-based and/or blocked systems.

Molybdenum, tungsten and vanadium catalysts are described more particularly for the reaction of blocked polyisocyanates in WO 2004/076519 and WO 2004/076520.

Cesium salts as well can be used as catalysts. Suitable cesium salts are those compounds in which the following anions are employed: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and also $(C_{n+1}H_{2n-2}O_4)^{2-}$, where n stands for the numbers 1 to 20.

Preferred here are cesium carboxylates in which the anion conforms to the formulae $(C_nH_{2n-1}O_2)^-$ and also $(C_{n+1}H_{2n-2}O_4)^{2-}$, with n being 1 to 20. Particularly preferred cesium salts contain monocarboxylate anions of the general formula $(C_nH_{2n-1}O_2)^-$, with n standing for the numbers 1 to 20. Particular mention in this context is deserved by formate, acetate, propionate, hexanoate and 2-ethylhexanoate.

Preferred Lewis-acidic organic metallic compounds are dimethyltin diacetate, dibutyltin dibutyrate, dibutyltin bis(2-ethylhexanoate), dibutyltin dilaurate, dioctyltin dilaurate, zinc(II) dioctoate, zirconium acetylacetonate and zirconium 2,2,6,6-tetramethyl-3,5-heptanedionate.

Particular preference, however, is given to dibutyltin dilaurate.

Following the application of the coating composition of the invention, the coating-material mixture is cured at ambient temperature to 140° C., preferably 20 to 80° C., more preferably up to 60° C.

Depending on temperature, this usually takes not more than 12 hours, preferably up to 8 hours, more preferably up to 6, very preferably up to 4, and in particular up to 3 hours.

The substrates are coated by typical methods known to the skilled worker, with at least one coating composition being applied in the desired thickness to the substrate to be coated, and any volatile constituents of the coating composition being removed, if appropriate with heating. This operation may if desired be repeated one or more times. Application to the substrate may take place in a known way, as for example by spraying, troweling, knifecoating, brushing, rolling, rollercoating, flowcoating, laminating, injection backmolding or coextruding.

The thickness of a film of this kind for curing may be from 0.1 μm up to several mm, preferably from 1 to 2000 μm, more preferably 5 to 200 μm, very preferably from 5 to 60 μm (based on the coating material in the state in which the solvent has been removed from the coating material).

Additionally provided by the present invention are substrates coated with a multicoat paint system of the invention.

Polyurethane coating materials of this kind are especially suitable for applications requiring particularly high application reliability, exterior weathering resistance, optical qualities, solvent resistance, chemical resistance and water resistance.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, woodblock flooring, can coating and coil coating, for floor coverings, such as in parking levels or in hospitals and in particular in automotive finishes, as OEM and refinish.

Coating compositions of this kind are used preferably at temperatures between ambient temperature to 80° C., preferably to 60° C., more preferably to 40° C. The articles in question are preferably those which cannot be cured at high temperatures, such as large machines, aircraft, large-capacity vehicles, and refinish applications.

In particular the coating compositions of the invention are used as clearcoat, basecoat and topcoat(s), primers and surfacers.

Unless otherwise indicated, hydroxyl numbers and acid numbers in this specification are determined in accordance with DIN 53240, Part 2.

The glass transition temperature, $T_g$, is determined preferably in this specification in accordance with ASTM Specification D3418-03 via differential scanning calorimetry (DSC), preferably with a heating rate of 10° C./min.

EXAMPLES

Polymer 1

A 500 ml four-neck glass flask with water separator was charged with sebacic acid (380.1 g), trimethylolpropane (120.1 g) and dibutyltin laurate (0.051 g) under nitrogen and this initial charge was heated with stirring to 180° C. After 1 h the reaction mixture was cooled to 120° C., and isononanoic acid (67.9 g) was added with stirring. After a further 130 min at 120° C., the reaction was cooled and the product was dissolved in butyl acetate.
Acid number (AN) 96 mg KOH/g
Hydroxyl number (OHN) 213 mg KOH/g
Number-average molar weight Mn 504 g/mol
Weight-average molar weight Mw 27675 g/mol
Solids content 61%

Polymer 2

A 6 l four-neck flask with reflux condenser and water separator was charged with di-trimethylolpropane (2267.3 g), sebacic acid (1831.8 g) and dibutyltin laurate (0.858 g) under nitrogen and this initial charge was heated with stirring to 150-170° C. After a reaction time of 2 h it was cooled and the product was dissolved in 1 l of butyl acetate.
AN 85
OHN 341
Mn 1409 g/mol
Mw 3352 g/mol
Tg −37° C.

Polymer 3

A 1 l four-neck flask with water separator was charged with di-trimethylolpropane (276.5 g), sebacic acid (202.2 g) and dibutyltin laurate (0.1 g) under nitrogen and this initial charge was heated with stirring to 160-180° C. After a reaction time of 1.5 h it was cooled and the product was dissolved in 125 ml of butyl acetate.
AN 66 mg KOH/g
OHN 294 mg KOH/g
Mn 1955 g/mol
Mw 6633 g/mol
Tg −21° C.

Polymer 4

A 500 ml four-neck flask with water separator was charged under nitrogen with cyclohexane-1,4-dicarboxylic acid (1139 g), trimethylolpropane (1775 g) and dibutyltin laurate (1.09 g) and this initial charge was heated with stirring to 160-180° C. After 4 h, dimethyl adipate (576.2 g) was added over a period of 2 h and subsequently, for a further 2 h, the mixture was boiled, with removal of 283 g of water/ethanol mixture. Cooling gave a clear, yellow polyester.
AN 15 mg KOH/g
OHN 427 mg KOH/g
Mn 290 g/mol
Mw 1150 g/mol
Tg −38° C.

Polymer 5

Hydrophobic Modification of a Commercial Hyperbranched Polyester to Make it Easier to Mix with a Coating Composition A four-neck flask with reflux condenser and water separator was charged with Boltorn® H40 (hyperbranched polyester from Perstorp, synthesized from 2,2-dimethylolpropionic acid, OH number: 470-500 mg KOH/g, $M_n$ 7300 g/mol, $M_w$ 5100 g/mol, Tg about 40° C., approximately 64 terminal hydroxy functions) (298.0 g), isononanoic acid (201.6 g) and dibutyltin laurate (0.25 g) under nitrogen and this initial charge was heated with stirring to 190° C. After a reaction time of 2 h, at an acid number of 15 mg KOH/g, the batch was cooled and the product was dissolved in butyl acetate (125 ml).

Syntheses of the Nanoparticles

Silicate 1

A dispersion of 160 g of Levasil 200 (30 wt % SiO2, about pH 2.5) and 160 ml of isopropanol was admixed with stirring with 9.36 g of isobutyltriethoxysilane and the mixture was stirred for 16 hours more. Under reduced pressure and with continuous addition of 2 l of isopropanol, the dispersion was concentrated to approximately 300 g at 50° C. Following addition of 500 ml of butyl acetate, the dispersion was concentrated to 259 g. This gives a transparent dispersion of functionalized silica particles (DLS: 44 nm) with a residual water content of 0.1%.

Comparative Performance Tests:

Test Method:

The coating materials were baked at 80° C. or 130° C. for 30 minutes.

Scratch resistance: the scratch resistance was tested by rubbing over the film surface using a Scotchbrite pad (Scotchbrite®, 7448 type S ultrafine) measuring 1×1 cm, with an applied weight of 500 g. The gloss of the coating was determined using a Mikro TRI-Gloss measuring instrument. The reduction in gloss after 10 and 50 double rubs (dr) can be taken as a measure of the scratch resistance of the coatings. After 50 double rubs, the coatings were stored at 60° C. for 1 h or at 60° C. for 30 minutes and at room temperature (r.t.) for 12 h and then the gloss was determined again, as a measure of the reflow capacity.

The pendulum hardness was determined by the method of König (DIN EN ISO 1522). The Erichsen cupping was determined in accordance with DIN EN ISO 1520.

The dust-dry time was determined by contacting the film surface with a cottonwool pad; when cotton no longer remains adhering to the surface, the coating is considered to be dust dry.

To test the drying characteristics of the coatings, a wheeled hopper filled with about 60-80 g of sand is drawn at a constant speed of advance over a glass plate coated with coating material. The speed of advance is 1 cm/h. After the end of the tests, the plate is freed from the loose sand. Sand drying is the term used for the time which elapses between the beginning of the test until the last durable attachment of the grains of sand. The drying-through-volume is determined as the time during which the wheels of the hopper still leave a track in the coating.

|  | Comp. 1 | Inv. 1 |
| --- | --- | --- |
| Basonat ® HI 100 [g] | 30.2 | 30.2 |
| Joncryl ® 922 [g] | 35.0 | 35.0 |
| Polymer 1 [g] | 35.0 | 35.0 |
| Nanobyk ® 3650 [g] |  | 7.06 |
| Butyl acetate [g] | 74.0 | 68.0 |
| Dust dry [min] | 270 | 240 |
| Erichsen cupping [mm], 30', 80° C. | >9 | >9 |
| Erichsen cupping [mm], 30', 130° C. | >9 | >9 |
| Gloss (60°), 30', 80° C. | 97.7 | 96.1 |
| Gloss (60°), 10 dr, 30', 80° C. | 27.4 | 51.8 |

-continued

|  | Comp. 1 | Inv. 1 |
|---|---|---|
| Gloss (60°), 50 dr, 30', 80° C. | 24.2 | 47.0 |
| Gloss (60°), 1 h, 60° C., 30', 80° C. | 60.7 | 89.8 |
| Gloss (60°), 30', 130° C. | 97.2 | 95.8 |
| Gloss (60°), 10 dr, 30', 130° C. | 25.3 | 44.0 |
| Gloss (60°), 50 dr, 30', 130° C. | 22.3 | 32.7 |
| Gloss (60°), 1 h, 60° C., 30', 130° C. | 62.7 | 86.8 |

Basonat ® HI 100 from BASF SE, Ludwigshafen: polyisocyanate containing isocyanurate-containing groups and based on hexamethylene diisocyanate, with an NCO content to DIN EN ISO 11909 of 21.5%-22.5%
Joncryl ® 922: polyacrylatol from BASF with an OH number of 140 mg KOH/g
Nanobyk ® 3650: surface-modified silica particles from BYK with a particle size (D50) of 20 nm.

|  | Comp. 2 | Inv. 2 | Inv. 3 | Inv. 4 |
|---|---|---|---|---|
| Basonat ® HI 100 [g] | 7.71 | 10.04 | 10.32 | 11.56 |
| Joncryl 922 [g] | 9.75 | 7.50 | 8.25 | 6.00 |
| Polymer 5 [g] | 9.75 | | | |
| Polymer 2 [g] | | 7.50 | | |
| Polymer 3 [g] | | | 8.25 | |
| Polymer 3 [g] | | | | 6.00 |
| Nanobyk 3650 [g] | 1.53 | 1.57 | 1.73 | 1.39 |
| Butyl acetate [g] | 10.95 | 14.25 | 16.50 | 11.25 |
| Dust dry [min] | 500 | 240 | 220 | 260 |
| Pendulum hardness [König], 7 h r.t. | tacky | 8 | 10 | 6 |
| Pendulum hardness [König], 24 h r.t. | 11 | 67 | 59 | 78 |
| Pendulum hardness [König], 3 d r.t. | 45 | 100 | 94 | 108 |
| Pendulum hardness [König], 7 d r.t. | 56 | 106 | 98 | 116 |
| Pendulum hardness [König], 7 d r.t., 15 h, 60° C. | 63 | 107 | 100 | 113 |
| Gloss (60°), 30', 60° C. | 96.9 | 97.5 | 97.9 | 94.8 |
| Gloss (60°), 50 dr, 30', 60° C. | 4.9 | 43.4 | 51.4 | 34.1 |
| Gloss (60°), 1 h, 60° C., 30', 60° C. | 6.6 | 89.7 | 93.3 | 84.6 |
| Sand drying [h] | 10 | 3 | 3 | 5 |
| Drying-through-volume [h] | 12 | 3 | 3 | 4 |

|  | Comp. 3 | Inv. 5 | Inv. 6 |
|---|---|---|---|
| Basonat ® HI 100 [g] | 10.32 | 10.32 | 10.32 |
| Joncryl ® 922 [g] | 8.25 | 8.25 | 8.25 |
| Polymer 3 [g] | 8.25 | 8.25 | 8.25 |
| Nanobyk ® 3650 [g] | | 1.73 | |
| Silicate 1 [g] | | | 2.69 |
| Butyl acetate [g] | 16.50 | 16.50 | 15.55 |
| Dust dry [min] | 240 | 210 | 240 |
| Gloss (60°), 30', 60° C. | 97.1 | 96.8 | 95.8 |
| Gloss (60°), 10 dr, 30', 60° C. | 35.3 | 47.8 | 34.5 |
| Gloss (60°), 50 dr, 30', 60° C. | 38.3 | 43.5 | 45.0 |
| Gloss (60°), 1 h, 60° C., 30', 60° C. | 85.6 | 92.0 | 85.5 |

The invention claimed is:

1. A two-component polyurethane coating composition, comprising as synthesis components:
   (A) at least one polyisocyanate obtained by oligomerization of at least one monomeric isocyanate, wherein the polyisocyanate contains isocyanurate-containing groups and is based on hexamethylene diisocyanate;
   (B) at least one hydroxyl-comprising poly(meth)acrylate polyol which is a copolymer of at least one (meth)acrylic ester and at least one hydroxyalkyl (meth)acrylate;
   (C) at least one hyperbranched polyester polyol, either obtained by polycondensation of
   at least one dicarboxylic acid $A_2$ or at least one derivative thereof,
   optionally, at least one tri-functional or higher polyfunctional carboxylic acid $A_x$ with x≥3, wherein x represents the number of carboxylic acid functional groups in carboxylic acid A, or at least one derivative thereof, and
   at least one tri-functional or higher polyfunctional alcohol $B_y$ with y≥3, wherein y represents the number of hydroxyl groups in alcohol B, and also
   optionally, at least one diol $B_2$,
   or obtained by polycondensation of
   at least one tri-functional or higher polyfunctional carboxylic acid $A_x$ with x≥3, wherein x represents the number of carboxylic acid functional groups in carboxylic acid A, or at least one derivative thereof,
   optionally, at least one dicarboxylic acid $A_2$ or at least one derivative thereof, and
   at least one diol $B_2$, and
   optionally, at least one tri-functional or higher polyfunctional alcohol $B_y$ with y≥3; wherein y represents the number of hydroxyl groups in alcohol B, and
   (D) at least one silicate particle with a size of 5 to 150 nm whose surface has been modified with an at least monoalkoxylated silyl compound (S),
   wherein
   the ratio of isocyanate groups in (A) to isocyanate-reactive groups in (B) and (C) is 0.5:1 to 2:1,
   the weight ratio of (B):(C) is 50:1 to 1:20,
   the composition contains 0.5 to 50% by weight of (D), calculated as $SiO_2$, based on the total weight of (A), (B) and (C), and
   the silyl compound (S) is a compound of formula (I)

$$(R^1\text{—}O\text{—})_n\text{—}Si\text{—}R^2_{(4-n)} \quad (I),$$

wherein
$R^1$ is $C_1$ to $C_{20}$ alkyl,
$R^2$ is an organic radical comprising 1 to 20 carbon atoms, and
n is an integer from 1 to 3.

2. The composition of claim 1, wherein the poly(meth)acrylate polyol (B) has a number average molecular weight $M_n$ of 500 to 50 000.

3. The composition of claim 1, wherein the poly(meth)acrylate polyol (B) has an acid number to DIN EN ISO 3682 of up to 200 mg KOH/g.

4. The composition of claim 1, wherein the polyester polyol (C) has a sum of acid number and OH number to DIN 53240 Part 2 of up to 600 mg KOH/g.

5. The composition of claim 1, wherein $R^2$ is selected from the group consisting of $C_1$ to $C_{20}$ alkyl, $C_6$ to $C_{12}$ aryl, and $C_5$ to $C_{12}$ cycloalkyl.

6. The composition of claim 1, wherein (S) is selected from the group consisting of isooctyltrimethoxysilane, isooctyltriethoxysilane, n-butyltrimethoxysilane, n-butyltriethoxysilane, isobutyltrimethoxysilane, isobutyltriethoxysilane, phenyltrimethoxysilane and phenyltriethoxysilane.

7. A method of coating a substrate comprising applying the composition of claim 1 to the substrate.

8. An OEM or refinish coating on a part of a building, a vehicle, an aircraft, industrial equipment, a decorative element, a bridge, a building, a power mast, a tank, a container, a pipeline, a power station, a chemical plant, a ship, a crane, a post, sheet piling, a valve, a pipe, a fitting, a flange, a coupling, a hall, a roof, structural steel, furniture, a window, a door, woodblock flooring, a can, a coil, a floor covering, or a parking level, obtained from applying the composition of claim 1 to the part and drying.

9. The composition of claim 3, wherein the poly(meth)acrylate polyol (B) has a number average molecular weight $M_n$ of 500 to 50 000.

10. The composition of claim 4, wherein the poly(meth)acrylate polyol (B) has a number average molecular weight $M_n$ of 500 to 50 000.

11. The composition of claim 4, wherein the poly(meth)acrylate polyol (B) has an acid number to DIN EN ISO 3682 of up to 200 mg KOH/g.

12. The composition of claim 2, wherein the poly(meth)acrylate polyol (B) has an acid number to DIN EN ISO 3682 of up to 200 mg KOH/g.

13. The composition of claim 2, wherein the polyester polyol (C) has a sum of acid number and OH number to DIN 53240 Part 2 of up to 600 mg KOH/g.

14. The composition of claim 1, which further comprises at least one member selected from the group consisting of UV stabilizers, UV absorbers, free-radical scavengers, activators, drying agents, antistatic agents, flame retardants, thickeners, thixotropic agents, surface-active agents, viscosity modifiers, plasticizers and chelating agents.

15. The composition of claim 1, wherein the ratio of isocyanate groups in (A) to isocyanate-reactive groups in (B) and (C) is 0.8:1 to 1.2:1.

16. The composition of claim 1, wherein the ratio of isocyanate groups in (A) to isocyanate-reactive groups in (B) and (C) is 0.9:1 to 1.1:1.

17. The composition of claim 1, wherein the weight ratio of (B):(C) is 25:1 to 1:10.

18. The composition of claim 1, wherein the weight ratio of (B):(C) is 10:1 to 1:5.

19. The composition of claim 1, wherein the composition contains 1 to 40% by weight of (D), calculated as $SiO_2$, based on the total weight of (A), (B) and (C).

20. The composition of claim 1, wherein the composition contains 1.5 to 30% by weight of (D), calculated as $SiO_2$, based on the total weight of (A), (B) and (C).

21. The composition of claim 1, wherein the composition contains 1.5 to 25% by weight of (D), calculated as $SiO_2$, based on the total weight of (A), (B) and (C).

22. The composition of claim 1, wherein the composition contains 1.5 to 15% by weight of (D), calculated as $SiO_2$, based on the total weight of (A), (B) and (C).

23. The composition of claim 1, wherein (S) is isobutyltriethoxysilane.

24. The composition of claim 1, wherein the dicarboxylic acid is sebacic acid or cyclohexane-1,4-dicarboxylic acid.

25. The composition of claim 1, wherein $R^2$ is $C_1$ to $C_{20}$ alkyl, $C_6$ to $C_{12}$ aryl or $C_5$ to $C_{12}$ cycloalkyl.

* * * * *